May 3, 1949.     W. R. HELWIG     2,469,112
CIRCLE CUTTING BLOWPIPE MACHINE
Filed Oct. 16, 1945     3 Sheets-Sheet 3
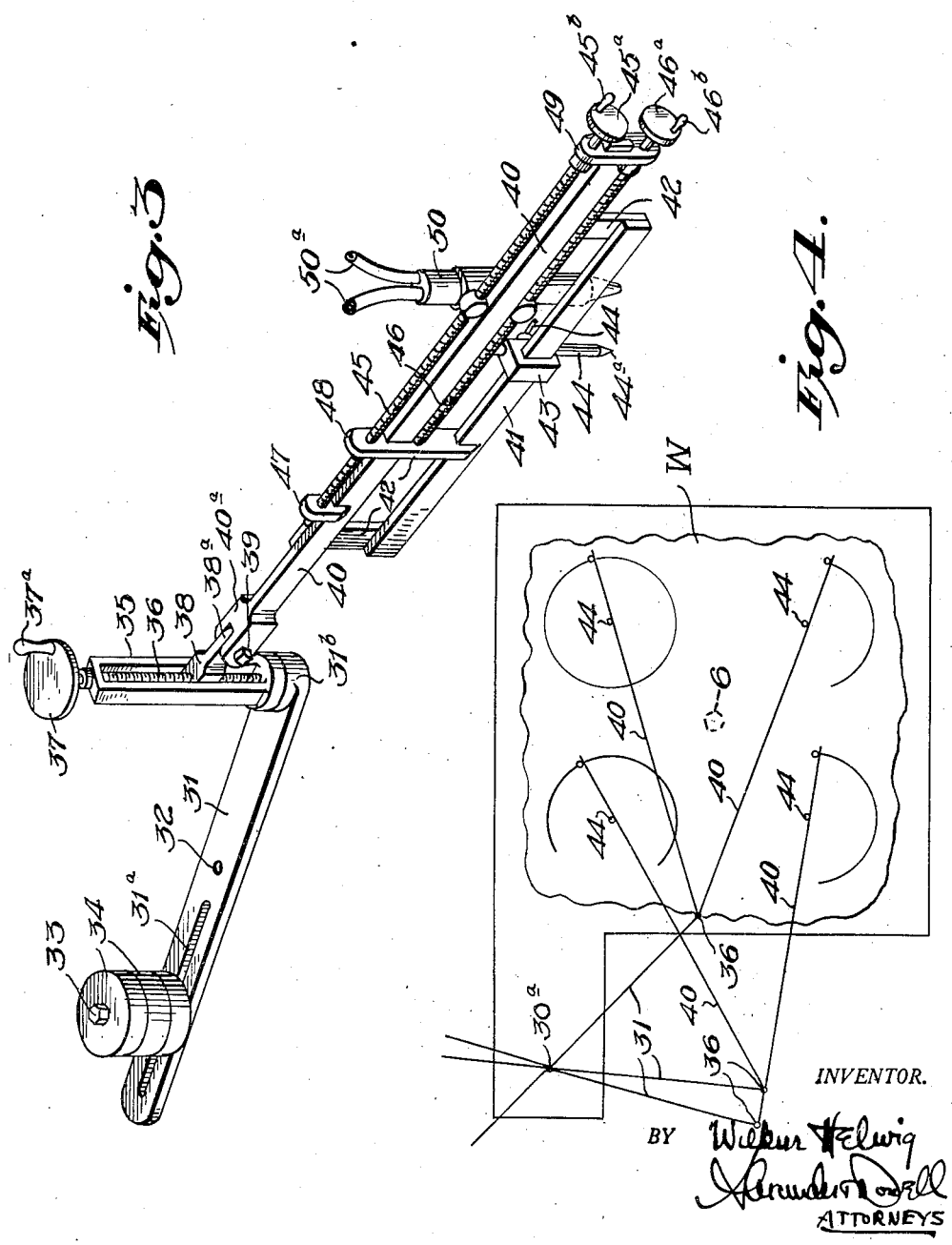
INVENTOR.
Wilbur Helwig
BY
ATTORNEYS Patented May 3, 1949

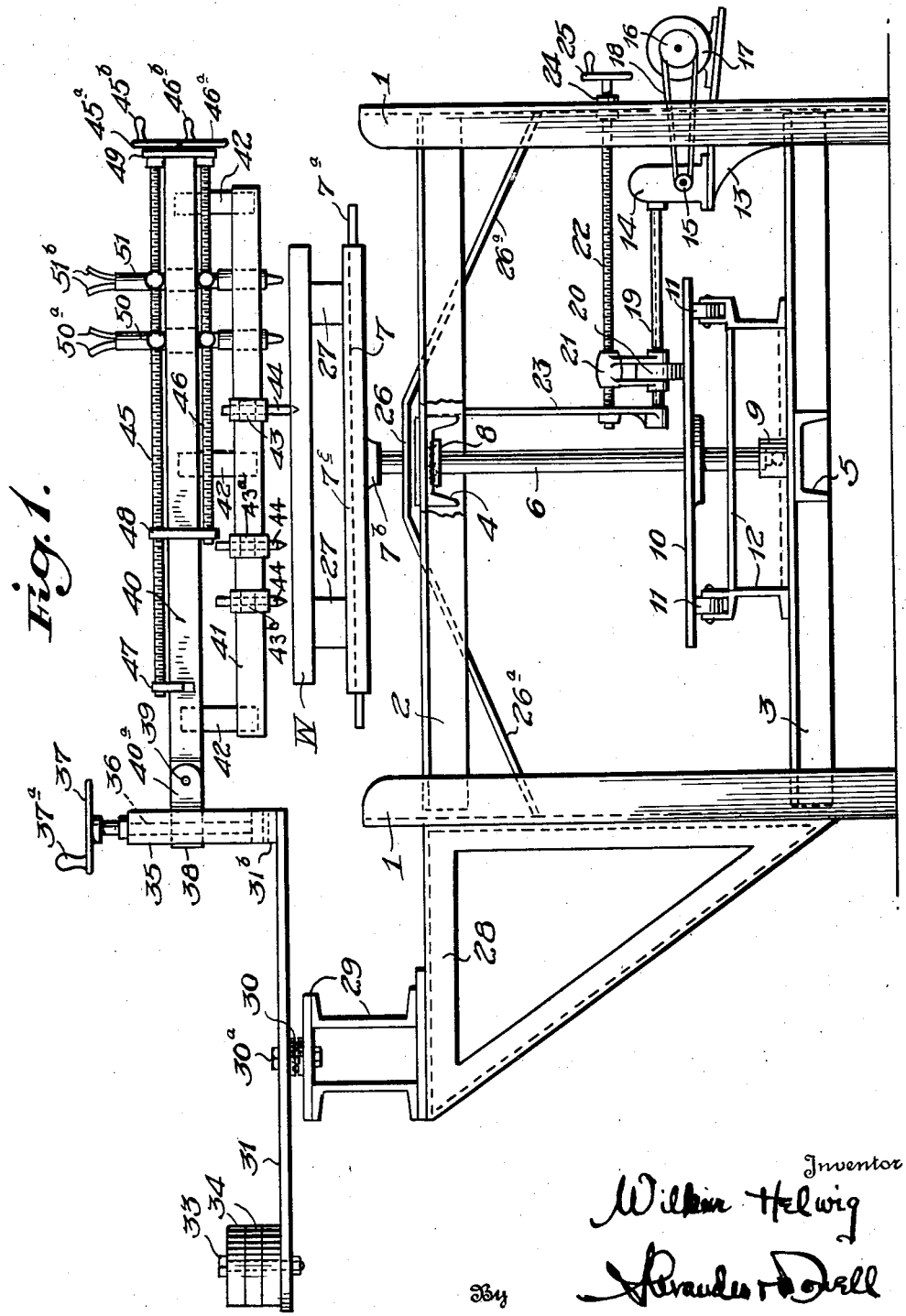

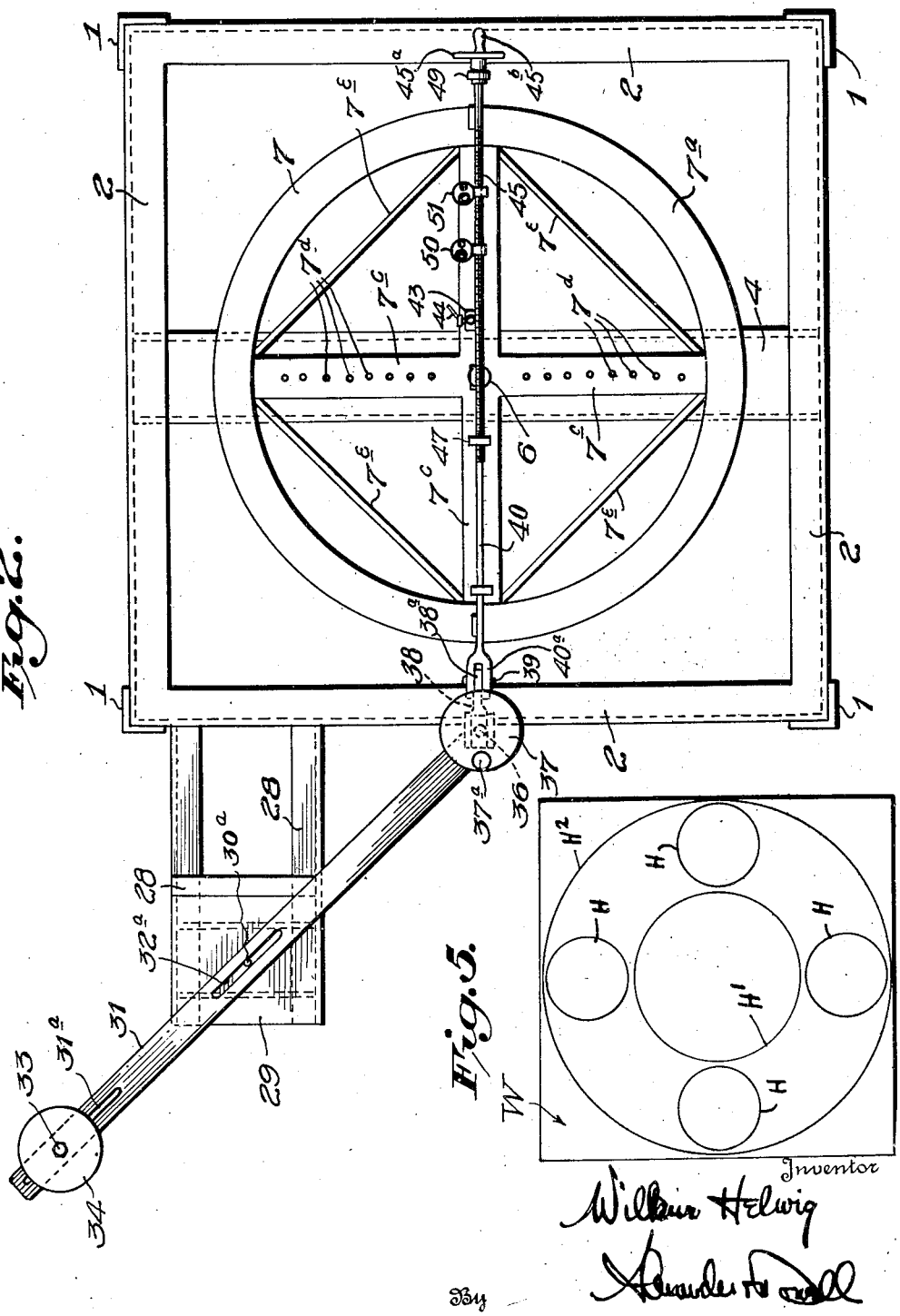

2,469,112

UNITED STATES PATENT OFFICE 2,469,112

CIRCLE CUTTING BLOWPIPE MACHINE

Wilbur Rutter Helwig, Baltimore, Md.

Application October 16, 1945, Serial No. 622,622

10 Claims. (Cl. 266—23)

This invention is a novel improvement in burning machines adapted to cut out or burn one or more holes or rings from work, such as sheet metal plates or the like, by means of acetylene torches, the machine comprising a frame having a rotatable work table driven at adjustable speeds and supporting the work to be cut or burned; the machine having an arm overlying the work pivoted at one end to a pivoted counter-balanced lever in the frame so as to have a free knuckled movement across the work, said arm having three adjustable centering points adapted to be successively positioned in centering holes anywhere in the work preliminarily to the cutting operations and the arm carrying one or more adjustable acetylene torches thereon, whereby one or more coaxial circular cuts by the torches about said centering holes may be performed in succession, the arrangement being such that when the centering point is located in a centering hole which is disposed eccentrically with respect to the center of rotation of the work table the centering point will, during rotation of the work, subscribe a circle whose radius is equal to the said eccentricity, causing the arm to move across the work during rotation thereof assuming different annularities with respect to the pivoted lever, which lever likewise pivots to assume different annularities, while at the same time the rotation of the work table will revolve the work about the eccentric centering point. By the above arrangement whereby a plurality of holes may be cut successively in the work without necessitating shifting the work on the work table, by merely successively engaging the centering point in successive centering holes in the work after each cutting operation, thereby eliminating the necessity of having to center the hole which is to cut in the work on the work table with respect to the usual fixed center of a fixed head of the machine before performing each cutting operation, and thus eliminating many preliminary operations preparatory to cutting a plurality of holes in the said plate.

I will explain the invention with reference to the accompanying drawings, which illustrate one practical embodiment thereof to enable others familiar with the art to adopt and use the same, and will summarize in the claims the novel features of construction, and novel combinations of parts, for which protection is desired.

In said drawings:

Figure 1 is a side elevation of my novel burning machine showing the work (a plate) supported on the rotatable work table and showing the centering point of the arm engaging an eccentrically disposed centering hole in the work offset from the axis of rotation of the work table.

Fig. 2 is a top plan view of the machine shown in Fig. 1.

Fig. 3 is a perspective view of the torch-holding arm and the supporting counter-balanced lever to which same is pivoted.

Fig. 4 is a diagrammatic view illustrating the use of the machine in cutting eccentrically disposed holes in the work.

Fig. 5 is a diagrammatic view illustrating another use of the machine.

As shown, the machine preferably comprises an open rectangular frame consisting of uprights 1, connected at their upper ends by horizontal frame members 2, and adjacent their lower ends by similar horizontal frame members 3, all of said members being conveniently formed of angle irons secured together at their meeting ends.

Extending between one pair of opposed cross members 2 and 3 respectively is an upper beam member 4 and a lower beam member 5 secured to the frame members 2 and 3 in any desired manner, said members 4 and 5 being disposed above the other end preferably axially of the frame. Extending through the upper beam member 4 is a vertical shaft 6 disposed centrally of the frame and carrying on its upper end a rotatable work table 7, hereinafter described. Preferably the upper end of shaft 6 is supported in a bearing 8 carried by the beam 4 while the lower end of shaft 6 is supported in an antifriction thrust bearing 9 mounted upon the lower beam member 5.

On shaft 6 between the beams 4 and 5 is a friction disk 10 fixedly secured thereto and of relatively large diameter, the outer portion of the disk 10 being supported by an annular series of rollers 11 journaled in an annular bracket 12 fixedly mounted upon the lower beam member 5, said rollers 11 preventing the outer portions of disk 10 from flexing.

Mounted upon a bracket 13 carried by the frame is a gear housing 14 having a drive pulley 15 disposed opposite a pulley 16 on the shaft of motor 17 supported on the frame, a belt or the like 18 running around the pulleys 15 and 16 for driving the gearing contained in housing 14. From the housing 14 extends a shaft 19 disposed radially of disk 10 and having its end journaled in bracket 23, shaft 19 being preferably splined and carrying a drive wheel 20 axially movable upon shaft 19 but rotatable therewith, wheel 20 frictionally engaging the upper face of disk 10, for rotating the said disk and shaft 6.

In order to adjust the speed of rotation of disk 10 and its shaft 6, the drive wheel 20 may be shifted axially of shaft 19 by means of a yoke 21 which is threaded upon a screw shaft 22 disposed parallel with and above the shaft 19 and journaled in said bracket 23 and in a bearing 24 at the side of the frame, screw shaft 22 carrying a hand wheel 25 at its outer end, whereby rotation of wheel 25 will cause the yoke 21 to shift the drive wheel 20 radially with respect to the disk 10, thereby permitting the use of a substantially constant speed motor 17 to rotate work table 7 at different desired speeds.

Preferably a shield plate 26 is provided at the upper end of the frame, the same overlying the beam member 4 and the same sloping downwardly as at 26a at opposite sides of beam 4, so as to protect the drive wheel 20 and disk 10 together with their associated parts from molten and dropping hot metal resulting from the burning operation of the work W on work table 7.

The work table 7 preferably comprises an annular rim 7a having a hub 7b (Fig. 1) mounted upon the upper end of shaft 6, and having radial spokes 7c, four being shown disposed 90° apart, each of the spokes being provided with an axial series of perforations 7d, as indicated in Fig. 2, whereby work supporting blocks 27 (Fig. 1) may be adjustably positioned thereon preferably by the use of bolts or the like passing through the perforations 7d and through perforations in the blocks or otherwise adjustably secured thereto in any desired manner, the blocks 27 directly supporting the work W, Fig. 1, so that the work will be rotated by and with work table 7. In order to stiffen the work table, flat bars 7e or the like are positioned edgewise with their ends welded or secured in the corners formed between the sides of the spokes 7c and the inner periphery of the rim 7a.

Extending from the side of the machine, adjacent one corner thereof, is a bracket 28 rigidly secured to the frame in any desired manner, said bracket 28 carrying a bearing support 29 adjacent its outer end of height substantially opposite the height of the work W on work table 7. Support 29 carries an antifriction bearing 30, Fig. 1, secured in central position thereon by bolt 30a passing through the top plate of the support 29 and the bearing. Upon the antifriction bearing 30 is a lever 31 having a hole 32 (Fig. 3), or an elongated slot 32a (Fig. 2), for the reception of bolt 30a whereby the lever 31 may be freely swingable in a horizontal plane upon the support 29, or owing to the slot 32a (Fig. 2) the lever may in addition be shifted axially upon the bolt 30a throughout an appreciable range.

At the outer end of lever 31 is an axial slot 31a for the reception of a bolt 33 which passes through the slot and through a selective series of circular or other shaped weights 34, whereby the weights may be adjusted axially of lever 31, for the purpose hereinafter described. At the inner end of lever 31 is a vertical head 35 (Fig. 3) open at its side adjacent the table 7 in which head 35 is rotatably journaled a screw shaft 36 extending above the head and provided with a hand wheel 37 having a knob 37a whereby the screw shaft 36 may be readily rotated. Head 35 is rotatably mounted on a lug 31b at the end of lever 31.

Upon the screw shaft 36 is a nut 38 projecting through the open end of the head and prevented from rotation by the side walls of the opening. Nut 38 is provided with a tongue 38a (Fig. 3) which is perforated to receive a bolt 39 passing through the bifurcated end 40a of an arm 40 which supports the acetylene burners and centering pin of the machine, hereinafter referred to. The arm 40 is thus freely swingable in a vertical plane on the pivot bolt 39, and the same is freely swingable in a horizontal plane owing to the rotatable connection of head 35 with the lever 31, which lever 31 is itself freely pivoted in a horizontal plane upon the bolt 30a of the support 29. Thus the arm 40 is free to move in any direction across the surface of work W on the work table 7, the arm 40 and lever 31 having a swingable knuckle movement illustrated diagrammatically in Fig. 4. Arm 40 may also be raised or lowered with respect to work W by rotating screw 36.

Below the arm 40 is a parallel guide rod 41 secured thereto by vertical straps 42; and on the guide 41 is a slide 43 adjustably positioned thereon by means of a thumb screw 44 to bind same on guide 41 in adjusted position. Depending from the slide 43 is a vertically adjustable centering pin 44 carried thereby in any desired manner, the same having a pointed lower end 44a. By the above construction the centering pin 44 may be shifted axially of the guide bar 41 and is also vertically adjustable to compensate for wear.

The arm 40 also carries upper and lower screw shafts 45 and 46 which are fixedly mounted in bracket bars 47, 48 and 49 as shown in Figs. 1 and 3, said shaft extending through the outer bracket 49 and carrying hand wheels 45a and 46a respectively provided with knobs 45b and 46b whereby the respective screw shaft 45 may be rotated.

Slidably mounted upon the arm 40 are one or more acetylene torch heads 50 and 51 of any well known type, having their tips disposed slightly above the point 44a of centering pin 44, said burners 50 and 51 being fed with metal cutting gases introduced therein through flexible hoses 50a and 51b respectively. One burner, such as 50, is axially movable on the arm 40 by the screw shaft 45, while the other burner 51 is axially movable on arms 40 by means of the screw shaft 46, to adjust the positioning of the burner heads radially with respect to the centering pin 44. While I have shown two burners 50 and 51 in Fig. 1, a single burner 50 may be used as shown in Fig. 3, or more than two burners may be used and mounted upon the arm 40 in a manner similar to the burners 50 and 51 in Fig. 1.

In operation, the operator clamps the blocks 37 in proper position on the work table 7 and then clamps or otherwise secures the work W on top of the blocks 27; and the motor 16 is actuated and yoke 21 adjusted to revolve work table 7 at the desired speed. The centering pin 44 of arm 40 may then be shifted on the guide 41 to bring same any desired radial distance from one burner (or the other burner 51) and the slide 43 clamped in such position on guide 41, utilizing thumb screw 44.

As indicated in Fig. 4, if it is desired to cut spaced circular holes in the work W rotatably supported upon the work table 7, it would first be necessary to determine the centers of such holes, and with a centering punch make depressions in the work at the centers of each of the desired holes to successively receive the centering pin 44. The radius of the holes is determined by the distance from the point 44 to the axis of the burner 50 or 51 to be used.

When the burner is lighted the centering point 44 will be placed in the first one of the centering holes in the work, and as the work is rotated the arm 40 and lever 31 would be shifted therewith to assume different annularities with a knuckle-like movement diagrammatically illustrated in Fig. 4, to describe a circle with respect to the axis of shaft 6, while the work W is rotating, said circle having a radius equal to the distance between the axis of rotation of table 7 and the centering pin 44. The lighted burner 50 or 51 during rotation of the work about the eccentrically disposed pin 44 would make a circular cut around the eccentric pin 44 and thereby cut a hole in the work after the work table had made one complete revolution irrespective of the eccentricity of the point 44 with respect to the axis of rotation of the table 7.

From the above construction if a plurality of holes are to be cut in the work W it is only necessary to punch the different hole centers in the work, and in succession place the centering point 44 in the prepunched centering holes, thereby in succession cutting out holes at different points in the work without having to shift the work so as to bring the center of the hole to be cut coaxially of the centering point 44 of the arm 40. During rotation of the work the arm 40 and link 31 will assume different angularities as clearly indicated in Fig. 4 without interfering with the operation of cutting eccentrically disposed holes in the work at any location therein and at any eccentricity with respect to the center of rotation of the work. By utilizing a pair of torches 50 and 51 each of which is ignited during operation a series of annular rings may be cut from the work in the same manner above described whereby holes are cut therein when only one burner was lighted.

My invention therefore provides a burning machine in which many of the preliminary operations now necessary are eliminated, particularly those with respect to the centering of the work on the table after each cutting operation before the next hole can be cut therein, this being due to the free swinging knuckle movement of the arm 40 above and across the work W as distinguished from machines heretofore made in which the center point of the arm or head is fixedly disposed coaxially with the center of rotation of the work table.

Fig. 5 illustrates another use of the machine when equipped with adjustable slides 43, 43a and 43b (Fig. 1) each carrying centering pins 44. These slides 43, 43a and 43b may be set on guide 41 for cutting a plurality of holes in successive pieces of work W of different diameters. For instance in the positions of parts shown in Fig. 1, the pin 44 of slide 43 may be lowered (as shown) and one torch 50 or 51 used therewith to cut, say, 6" diameter holes H in plate W as shown in Fig. 5; then the pin 44 of slide 43a may be lowered (with the pin of slide 43 raised) and the machine used to cut a hole H' of substantially 12" diameter in plate W; then with pins 44 of slides 43 and 43a raised, the pin 44 of slide 43b may be lowered and the machine used to cut a hole H2 of substantially 15" diameter in plate W. When finished all three pins 44 are in position for cutting similar holes in successive plates without wasting the time of the operator in resetting slides.

I do not limit my invention to the exact form shown in the drawings, for obviously changes may be made therein within the scope of the claims.

I claim:

1. A burning machine, comprising a frame; a rotatable work table in said frame; a lever pivoted on said frame to one side of the table; a head rotatably mounted adjacent one end of the lever; an arm pivoted on said head and overlying the work table; a centering pin axially adjustably mounted on the arm; and a plurality of acetylene burner heads axially adjustably mounted on the arm; said pivoted lever permitting the arm to swing freely with a knuckle movement across the work when the centering pin is engaged in the work eccentrically of the axis of rotation thereof, said lever having an axial slot adjacent its center; an antifriction bearing upon said frame below the slot; and a bolt transfixing the slot in the lever, the bearing, and the underlying portion of the frame, whereby the lever may be shifted axially on the frame.

2. A burning machine, comprising a frame; a rotatable work table in said frame; a lever pivoted on said frame to one side of the table and disposed at substantially the level of the work table; a head rotatably mounted adjacent one end of the lever; a counter-balance weight mounted adjacent the other end of the lever; an arm pivoted on said head and overlying the work table; a centering pin axially adjustably mounted on the arm; and a plurality of acetylene burner heads axially adjustably moutned on the arm; said pivoted lever permitting the arm to have a free swinging knuckle movement across the work when the centering pin is engaged in the work eccentrically of the axis of rotation thereof, said lever having an axial slot adjacent its center; an anti-friction bearing upon said frame below the slot; and a bolt transfixing the slot in the lever, the bearing, and the underlying portion of the frame, whereby the lever may be shifted axially on the frame.

3. A burning machine, comprising a frame; a rotatable work table in said frame; a lever pivoted on said frame to one side of the table and disposed at substantially the level of the work table; a head rotatably mounted adjacent one end of the lever having a rotatable screw shaft disposed normal to the plane of the work table; a non-rotatable nut in the head and threaded on the screw shaft; an arm pivoted on a horizontal axis on said nut and overlying the work table; a centering pin axially adjustably mounted on the arm; and a plurality of acetylene burner heads axially adjustably mounted on the arm; said pivoted lever permitting the arm to have a free swinging knuckle movement across the work when the centering pin is engaged in the work eccentrically of the axis of rotation thereof.

4. In a machine as set forth in claim 3, said lever having an axial slot adjacent its center; an antifriction bearing upon said frame below the slot; and a bolt transfixing the slot in the lever, the bearing, and the underlying portion of the frame, whereby the lever may be shifted axially on the frame.

5. In a machine as set forth in claim 3, a plurality of screw shafts journaled on the arm having hand wheels for rotation thereof; and said burner heads having threaded portions respectively engaging the screw shafts, whereby the heads may be individually shifted on the arm.

6. A burning machine, comprising a frame; a rotatable work table in said frame; means for rotating the table at different speeds; a lever pivoted on said frame to one side of the table and disposed at substantially the level of the work table; a head rotatably mounted adjacent one end of the lever having a rotatable screw shaft disposed normal to the plane of the work table; a counter-balance weight mounted adjacent the other end of the lever; a non-rotatable nut in the head and threaded on the screw shaft; an arm pivoted on a horizontal axis on said nut and overlying the work table; a centering pin axially adjustably mounted on the arm; and a plurality of acetylene burner heads axially adjustably mounted on the arm; said pivoted lever permitting the arm to have a free swinging knuckle movement across the work when the centering pin is engaged in the work eccentrically of the axis of rotation thereof.

7. In a machine as set forth in claim 6, said counter-balanced end of the lever being axially slotted; said weight comprising a series of superimposed disks having axial holes extending therethrough; and a bolt transfixing the weights and slotted end of the lever, whereby the weights may be shifted on the lever.

8. In a machine as set forth in claim 6, said lever having an axial slot adjacent its center; an antifriction bearing upon said frame below the slot; and a bolt transfixing the slot in the lever, the bearing, and the underlying portion of the frame, whereby the lever may be shifted axially on the frame.

9. In a machine as set forth in claim 6, a guide bar carried by the arm disposed parallel therewith; a slide on said bar; means for binding the slide in adjusted position on the bar; and said centering point being vertically adjustably mounted in the slide and having a pointed lower end.

10. In a machine as set forth in claim 6, a plurality of screw shafts journaled on the arm having hand wheels for rotation thereof; and said burner heads having threaded portions respectively engaging the screw shafts, whereby the heads may be individually shifted on the arm.

WILBUR RUTTER HELWIG.

REFERENCES CITED

The following references are of record in the file of this patent:

UNITED STATES PATENTS

| Number | Name | Date |
|---|---|---|
| 1,176,584 | Madgett | Mar. 21, 1916 |
| 2,088,695 | Fausek et al. | Aug. 3, 1937 |
| 2,265,237 | Johnson | Dec. 9, 1941 |
| 2,323,298 | Cook | July 6, 1943 |
| 2,363,007 | Kohlhafer et al. | Nov. 21, 1944 |
| 2,377,844 | Stone | June 5, 1945 |

FOREIGN PATENTS

| Number | Country | Date |
|---|---|---|
| 202,876 | Great Britain | Aug. 30, 1923 |
| 202,933 | Great Britain | Aug. 27, 1923 |
| 598,666 | France | Dec. 22, 1925 |